United States Patent [19]

Burrack et al.

[11] 3,881,449
[45] May 6, 1975

[54] STACK FEEDING DEVICE

[76] Inventors: Theodore W. Burrack; Gary F. Burrack, both of Farmersburg, Iowa 52047

[22] Filed: Apr. 25, 1973

[21] Appl. No.: 354,171

[52] U.S. Cl. ................................................ 119/60
[51] Int. Cl. ............................................ A01k 5/00
[58] Field of Search .......................... 119/60, 20, 27

[56] References Cited
UNITED STATES PATENTS

| | | | |
|---|---|---|---|
| 2,729,196 | 1/1956 | Breitenback | 119/20 |
| 3,135,267 | 6/1964 | Liebig | 119/20 X |
| 3,336,908 | 8/1967 | Swanson | 119/60 |

Primary Examiner—Robert Peshock
Assistant Examiner—J. N. Eskovitz
Attorney, Agent, or Firm—William L. Huebsch

[57] ABSTRACT

A device for restricting the waste of stacked forage materials being fed to cattle. The device includes a rigid frame having vertical walls adapted to surround the stack. The walls have structural members defining openings adapted to receive the heads of cattle. The openings are sufficiently narrow that the structural members will abut and restrict passage of the shoulders of the cattle, and the frame is movably supported on the ground so that feeding cattle may move the frame to retain access to the feed material as the stack is consumed. The frame has portions relatively movable between open and closed positions to afford positioning the device around a stack.

4 Claims, 3 Drawing Figures

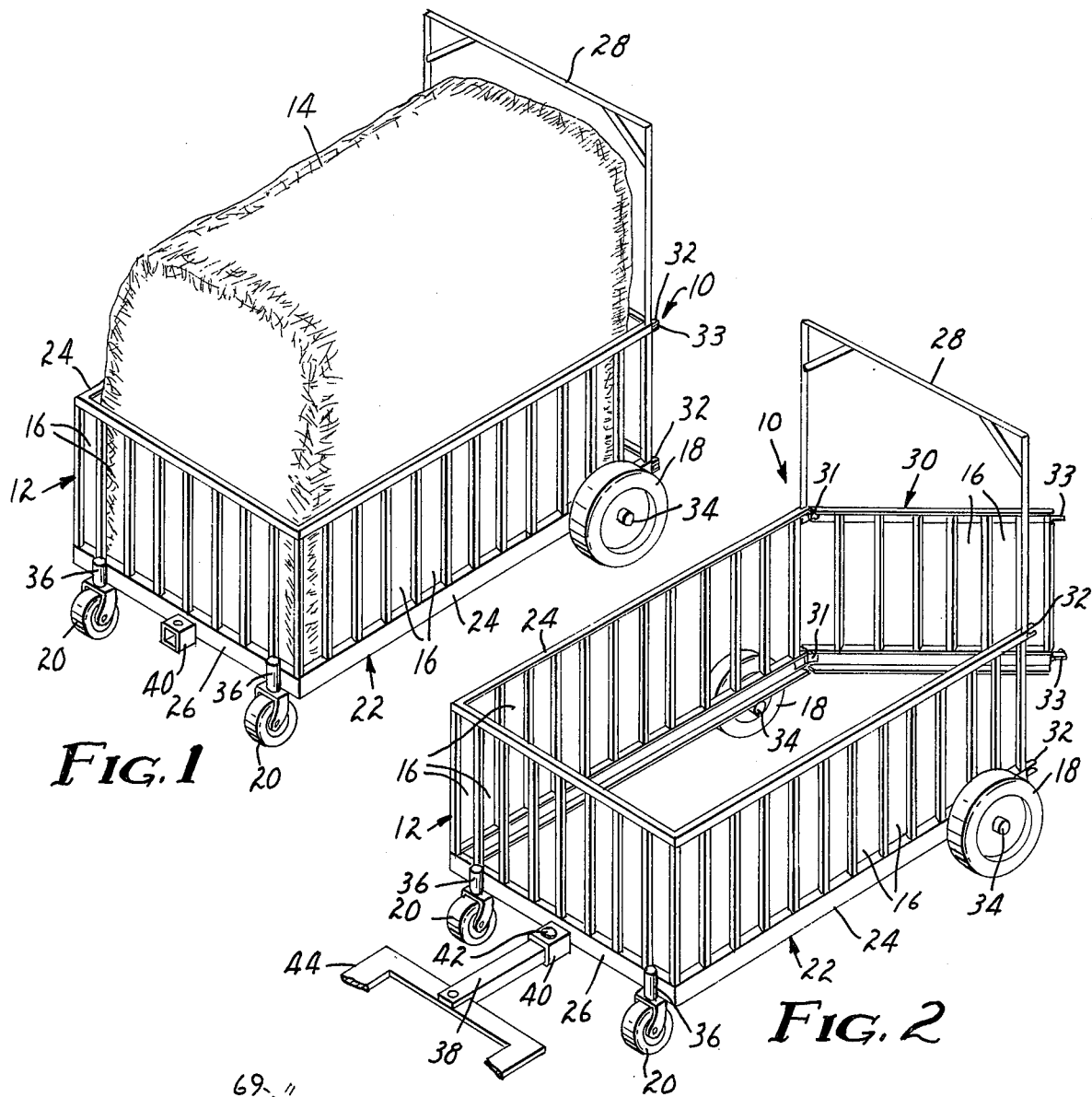
FIG. 1
FIG. 2
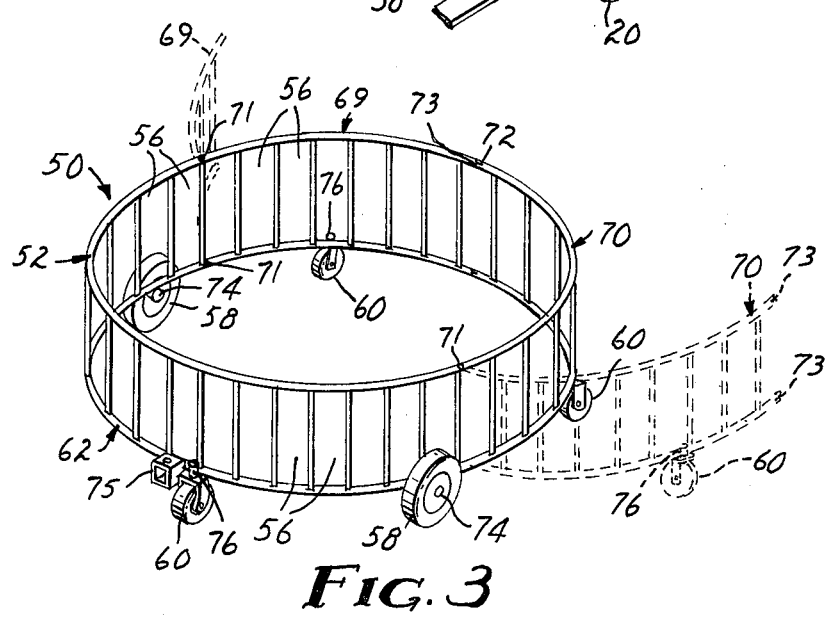
FIG. 3

STACK FEEDING DEVICE

FIELD OF THE INVENTION

The present invention relates to devices used in the distribution of feed to animals and in one aspect to devices used in restricting waste of stacked forage materials being fed to cattle.

BACKGROUND OF THE INVENTION

The use of stacks has become popular as a method of storing and feeding forage materials such as corn fodder and hay. The stack typically is about 12 feet high, having a base size typically in the range of about 8 feet wide by 10 feet long to 10 feet wide by 20 feet long and containing about 3 to 6 ton of feed material compressed to about half the density of a conventional bale. Typically, stacks are stored in a central location, and are fed by transporting a stack to a feeding location with special stack moving equipment, depositing the stack on the ground, and allowing cattle to pull the material from the stack. Cattle have a tendency to scatter the stacked material and use the scattered material as bedding, after which the scattered material will not readily be eaten. It has been found that restricting the access of cattle to the stack by causing them to reach their heads through an enclosure to eat from the stack will save up to thirty percent of a stack. Prior art enclosures for restricting the access of cattle to the stack have included fence enclosures built in spaced relationship around stacks, both by conventional methods with posts and wire, and by attaching together a plurality of gates. A significant amount of manual labor is required to position an enclosure made by either of these methods, however, and more importantly as the stack is consumed the size of the enclosure must be decreased by further manual labor in order that cattle may continue to reach the stack.

SUMMARY OF THE INVENTION

A stack feeding device according to the present invention efficiently restricts waste by cattle of stacked forage materials being fed to the cattle. The device is adapted to be positioned around the stack with a minimum of manual labor through the use of a farm tractor, and the device will be moved relative to the stack by the action of feeding cattle so that the entire stack may be consumed without adjustment of the device.

The feeding device consists of a frame having generally vertical walls adapted to surround the stack, and includes means for supporting the frame on the ground for movement relative to the stack. The walls of the frame consist of spaced structural members defining a plurality of openings each adapted to receive the head of one of the cattle feeding from the stack. The openings are sufficiently narrow that the structural members will abut the shoulders of cattle feeding through the openings. As the stack diminishes in size, the attempts of the cattle to reach the remaining feeding material will move the frame relative to the stack, allowing the cattle to eventually consume the entire stock.

The means for supporting the frame on the ground for movement relative to the stack may include wheels or skids, or a combination thereof. The use of two wheels having aligned axes fixed relative to the frame facilitates trailing of the device behind a tractor during movement of the device between feeding sites. A combination of two wheels having such fixed axes and one or more caster wheels is the preferred support means to afford movement of the frame by feeding cattle, particularly where the feeder is to be used in areas subjected to freezing temperatures, because wheels are more easily extracted from frozen ground by feeding cattle than are skids.

The frame must be sufficiently rigid to withstand the forces exerted by feeding cattle. The openings should have sufficient height to receive the heads of standing cattle, and may extend sufficiently close to the ground to allow feeding cattle to lay down. The walls of the frame may be disposed in any pattern which will enclose the stack (e.g. rectangular or circular) with a pattern being preferred which corresponds to and is slightly larger than the periphery of a stack for which the device is adapted. The openings are preferably formed in all sides so that, at least initially, cattle may have access to the stack from all sides.

The frame has portions mounted to each other for relative movement between an open position to afford movement of the feeder (as by a farm tractor) to position one of the portions adjacent the stack, after which the other portion may be moved to a closed position where it is releasably retained by a latch between the portions.

BRIEF DESCRIPTION OF THE DRAWING

The present invention will be more clearly understood upon a careful reading of the following description which refers to the accompanying drawing wherein like numbers refer to like parts in the several views, and wherein:

FIG. 1. is a perspective view of a first embodiment of a feeding device according to the present invention positioned around a stack;

FIG. 2 is a perspective view of the feeding device of FIG. 1 having a gate portion of its frame in an open position and having a removable tongue coupled between the frame and a tractor to afford movement of the feeding device to a position around a stack; and FIG. 3 is a perspective view of a second embodiment of a feeding device according to the present invention.

DESCRIPTION OF THE PREFERRED EMBODIMENT

Referring now to FIGS. 1 and 2 of the drawing there is illustrated a first embodiment of a feeding device according to the present invention generally designated by the numeral 10. The feeding device 10 consists of a frame 12 having four vertical walls. The walls are disposed in a rectangular pattern and the frame has inner dimensions adapted so that (as illustrated in FIG. 1) the walls will extend around the periphery of a rectangular stack of forage or feeding material 14 on the ground. Each of the walls is a lattice of spaced horizontal and vertical structural steel members defining a series of rectangular openings 16 adapted to receive the heads and necks of standing cattle. Each opening 16 is sufficiently narrow (i.e. in the range of about 10 to 14 inches) that the vertical structural members defining its side walls will abut the shoulders of a critter reaching through the opening 16 to eat from the stack 14. The frame 12 is supported on the ground by a pair of rubber tired wheels 18 having axes of rotation fixed relative to the frame 12 and a pair of rubber tired caster wheels 20. The wheels 18 and 20 provide means affording movement of the frame 12 relative to the stack 14 by the action of feeding cattle so that the stack 14 will be entirely consumed.

As is best seen in FIG. 2, the frame 12 includes a first portion 22 including two vertical side walls 24 joined by a vertical end wall 26 disposed in a generally U-shaped pattern and having an open end. The open end affords movement of the first portion 22 adjacent a stack for which the device is adapted with the stack within the frame portion formed by the walls 24 and 26. The open end is bridged by an inverted U-shaped brace 28, which brace 28 is adapted to pass over a stack for which the device 10 is adapted as the first portion 22 is positioned adjacent the stack.

The frame also includes a second portion 30 or vertical wall providing a gate adapted to span the open end of the first portion 22. One end of the second portion 30 is mounted on one of the side walls 24 at its end opposite the end wall 26 by a pair of hinges 31 for pivotal motion relative to the first portion 22 between an open position (FIG. 2) spaced from the open end to afford movement of the first portion 22 adjacent a stack, and a closed position (FIG. 1) with the second portion 30 extending across the open end. The second portion 30 may be releasably latched in the closed position by a latch means including vertically spaced pairs of clevis like projections 32 on the end of one side wall 24 and vertically spaced bars 33 projecting from the end of the second portion 30 opposite the hinge 31. The projections 32 and bars 33 have vertical openings adjacent their ends. Each bar 33 is positioned so that when the second portion 30 is in the closed position, the end of the bar 33 will be between one of the pairs of projections 32 with the openings of the bar 33 and projections 32 aligned to receive a pin, thereby releasably latching the portions 22 and 30 in the closed position and providing a desired rigidity therebetween.

The wheels 18 and 20 which movably support the frame 12 are mounted on the first portion 22 thereof. Each of the wheels 18 is mounted on a hub 34 fixed to the bottom horizontal member of one of the side walls 24 adjacent the end thereof opposite the end wall 26, with the wheels 18 in coaxial opposed relationship. The caster wheels 20 are mounted in bearings 36 attached in spaced relationship to the bottom horizontal member of the end wall 26 for pivotal motion about vertical axes. The caster wheels 20 afford pivotal motion of the frame 12 about a vertical axis through either of the wheels 18, which together with movement of the frame normal to the axes of the wheels 18 facilitates motion of the device 10 in virtually any direction relative to the stack via the action of feeding cattle.

The device 10 also includes a removable tongue 38 (FIG. 2) adapted to slidably engage a socket 40 centered on the bottom horizontal member of the end wall 26, and to be releasably retained in the socket 40 by a removable pin 42. The end of the tongue 38 opposite the socket 40 is adapted to be attached to the drawbar of a farm tractor 44 (FIG. 2) to facilitate movement of the device 10 between feeding sites. The tongue 38 is disposed at an angle normal to the axes of the wheels 18 so that the device 10 has the convenient handling characteristics of a two wheel trailer.

The following is an illustrative nonlimiting example of dimensions and materials for a feeding device according to the present invention of the type illustrated in FIGS. 1 and 2. The frame has inside dimensions of about 16 feet long by 9 feet wide and is adapted for use around a stack about 14 feet long by 8 feet wide. The walls are weldings of 1⅛ inch box iron vertical members, 3 inch angle iron top horizontal members, and 6 inch channel iron bottom horizontal members. The openings each have inside dimensions of 12 inches wide by 42 inches high. The frame is supported on fixed wheels having 8.00 by 15 inch balloon tires and on caster wheels having 4.80 by 8 inch balloon tires with the bottom of the opening being about 16 inches above the ground.

Referring now to FIG. 3 there is illustrated a second embodiment feeding device according to the present invention generally designated by the numeral 50. The feeding device 50 consists of a frame 52 having vertical walls disposed in a generally circular pattern and the frame 52 has inner dimensions adapted so that the walls will extend around the periphery of a circular stack of feeding material on the ground. The walls are a latticework of two spaced curved horizontal structural steel members (such as steel pipe) and a plurality of spaced vertical structural steel members defining a series of retangular openings 56 adapted to receive the heads and necks of cattle. Each opening 56 is sufficiently narrow (i.e. in the range of about 10 to 14 inches) that the vertical structural members defining its side walls will abut the shoulders of a critter reaching through the opening to eat from a stack. The frame 52 is supported on the ground by a pair of rubber tired wheels 58 having axes of rotation fixed relative to the frame 52, and three rubber tired caster wheels 60. The wheels 58 and 60 provide means affording movement of the frame 52 relative to a stack by the action of feeding cattle so that the stack will be entirely consumed.

The frame 52 includes a first portion 62 comprising a vertical wall curved along its length in a semicircular pattern and having an open end. The open end affords movement of the first portion 62 adjacent a stack for which the device is adapted with the stack adjacent the concave surface of the first portion 62.

The frame also includes second and third portions 69 and 70 each comprising a vertical wall curved along its length in a quarter circular pattern. The second and third portions 69 and 70 provide a pair of gates adapted to span the open end of the first portion 62. Ends of the second and third portions 69 and 70 respectively are mounted on different ends of the first portion 62 by a pair of hinges 71. The hinges 71 mount the second and third portions 69 and 70 for pivotal motion relative to the first portion 62 between an open position (shown in dotted outline) with the second and third positions 69 and 70 separated and spaced from the open end to afford movement of the first portion 62 adjacent a stack, and a closed position with the ends of the second and third portions 69 and 70 opposite the hinges 71 in engagement.

The second and third portions 69 and 70 may be releasably latched in the closed position by a latch means including two vertically spaced pairs of clevis like horizontal projections 72 mounted respectively on the ends of the upper and lower horizontal members of the second portion 69 at their ends opposite the hinges 71, and two horizontally projecting bars 73 mounted respectively on the upper and lower horizontal members of the third portion 70 at their ends opposite the hinges 71. The projections 72 and bars 73 have vertical openings adjacent their ends. Each bar 73 is positioned so that when the second and third portions 69 and 70 are in the closed position, the end of the bar 73 will be between one of the pairs of projections 72 with the openings of the bar 73 and projections 72 aligned to receive a pin, thereby releasably latching the second and third portions 69 and 70 in the closed position and providing a desired rigidity therebetween.

The wheels 58 are mounted on hubs 74 fixed adjacent different ends of the bottom horizontal member of the first portion 62 with the wheels 58 in coaxial opposed relationship. The caster wheels 60 are mounted in bearings 76 attached to the bottom horizontal member of the frame 52 for pivotal motion about vertical axes. One of the caster wheels 60 is approximately centered along the first portion 62 between the wheels 58. The other two caster wheels 60 are approximately centered along different ones of the second and third portions 69 and 70, which facilitates balance of the frame 52 when the second and third portions 69 and 70 are in the closed or open position. The caster wheels 60 afford pivotal motion of the frame 52 about a vertical axis through either of the wheels 58, which together with movement of the frame normal to the axes of the wheels 58 facilitates motion of the device 50 in virtually any direction relative to the stack via the action of feeding cattle.

The device 50 also includes a removable tongue (not shown) adapted to slidably engage a socket 75 centered on the bottom horizontal member of the first portion, and to be releasably retained in the socket 75 by a removable pin. The end of the tongue opposite the socket 75 is adapted to be attached to the drawbar of a farm tractor and the tongue is disposed at an angle normal to the axes of the wheels 58 so that the device 50 has the convenient handling characteristics of a two wheel trailer.

We claim:

1. A feeding device for restricting the waste of feed materials being fed to cattle from a stack of the feed material on the ground, said device comprising:

a rigid frame having four generally vertical walls, each wall comprising a lattice of spaced structural members defining a plurality of openings, each of which openings is adapted to receive the head of one of said cattle and is sufficiently narrow that structural members will abut and restrict passage of the shoulders of said cattle, three of said walls being rigidly assembled into a generally U-shaped portion of said frame having spaced ends defining an open side adapted to receive the stack and including a rigid brace comprising vertical and horizontal members bridging between said ends and adapted to pass over the stack received in said U-shaped portion, with the fourth wall being sufficiently long to span said open side and having one end pivotably mounted on one of the ends of said U-shaped portion for movement between a position from said open side and a closed position across the open side; and including means for releasably and rigidly latching said fourth wall in the closed position; and means for movably supporting the U-shaped portion of the frame on the ground adapted, when said fourth wall is in said open position, to allow movement of the U-shaped portion a said stack, and after said fourth wall is then moved to the closed position, to allow movement of the frame relative to the stack within said frame by the force exerted by cattle reaching through said openings to reach the stack.

2. A device according to claim 1, wherein said means for movably supporting the U-shaped portion of the frame on the ground includes two wheels rotatably mounted on said U-shaped portion adjacent said open side and having generally aligned fixed axes of rotation and at least one castor wheel at the end of the U-shaped portion opposite the open side.

3. A device according to claim 2, wherein said first portion includes a socket on said U-shaped portion at an end thereof opposite said open side, and said device further includes a tongue adapted at one end for attachment to a tractor, and having an opposite end adapted to engage said socket with the tongue extending at a right angle to the axes of the wheels, and means for releasably attaching said opposite end of the tongue in said socket.

4. A device according to claim 1, wherein said openings are in the range of about 10 inches to 14 inches wide.

* * * * *